United States Patent
Yoshida et al.

(10) Patent No.: US 11,119,889 B1
(45) Date of Patent: Sep. 14, 2021

(54) AUTOMATED SOFTWARE PROGRAM REPAIR

(71) Applicant: FUJITSU LIMITED, Kawasaki (JP)

(72) Inventors: Hiroaki Yoshida, Cupertino, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/936,390

(22) Filed: Jul. 22, 2020

(51) Int. Cl.
*G06F 11/36* (2006.01)
*G06F 9/445* (2018.01)
*G06F 8/33* (2018.01)

(52) U.S. Cl.
CPC ...... *G06F 11/3624* (2013.01); *G06F 11/3684* (2013.01); *G06F 8/33* (2013.01); *G06F 9/44521* (2013.01); *G06F 11/3672* (2013.01)

(58) Field of Classification Search
CPC .. G06F 11/3672; G06F 11/36; G06F 11/3664; G06F 11/3684; G06F 11/3688; G06F 9/44521; G06F 9/44536; G06F 9/45529; G06F 8/33; G06F 8/41; G06F 8/43; G06F 11/3624
USPC ........................................................ 717/124
See application file for complete search history.

(56) References Cited

U.S. PATENT DOCUMENTS

| | | | |
|---|---|---|---|
| 2008/0052695 A1* | 2/2008 | Dickenson et al. | G06F 8/436 717/151 |
| 2019/0108001 A1* | 4/2019 | Hauser | G06F 11/362 |

OTHER PUBLICATIONS

A. Zeller, "Yesterday, my program worked. Today it does not. Why?," FSE Mar. 11, 1999.
G. Misherghi, Z. Su, "HDD: Hierarchical Delta Debugging," ICSE May 28, 2006.
M. Hashimoto et al., "Automated patch extraction via syntax- and semantics-aware Delta debugging on source code changes," FSE Nov. 4, 2018.

* cited by examiner

*Primary Examiner* — Wei Y Zhen
*Assistant Examiner* — Mohammed N Huda
(74) *Attorney, Agent, or Firm* — Maschoff Brennan

(57) ABSTRACT

According to one or more embodiments, operations may include identifying a plurality of source code edits made between a buggy version of first source code of a first software program and a repaired version of the first source code. The operations may also include identifying a plurality of clusters of the source code edits. Each cluster of the plurality of clusters includes one or more source code edits of the plurality of source code edits. The operations may also include identifying a plurality of valid clusters of the plurality of clusters and identifying one or more invalid clusters of the plurality of clusters based on compiling of the first source code. Moreover, the operations may include identifying, as a first repair of the first error, a particular set of one or more valid clusters of the plurality of valid clusters while excluding the one or more invalid clusters from consideration.

16 Claims, 13 Drawing Sheets

```
public String get(Map<String, String> table) {
    for (String key : table.keySet()) { if (checkValue(table.get(key))) {
            return key;
        }
    }
    return null;
}
public boolean checkValue(String value) {...}
```

Buggy Version

```
public String get(Map<String, String> table) {
    for (Map.Entry<String, String> entry : table.entrySet()) {
        String key = entry.getKey();
        if (testValue(entry.getValue(key))) {
            return key;
        }
    }
    return null;
}
public boolean testValue(String value) {...}
```

Repaired Version

*FIG. 7A*

```
                                        ┌─ 716
Compile Error → Skip
public String get(Map<String, String> table) {
 ⚠ for (Map.Entry<String, String> entry : table.keySet()) { if (checkValue(table.get(key))) {
            return key;
        }
    }
    return null;
}
public boolean checkValue(String value) {...}
```

Buggy Version After Edit 1

```
                                        ┌─ 718
public String get(Map<String, String> table) {
 ⚠ for (String key : table.entrySet()) {
        String key = entry.getKey();
        if (testValue(entry.getValue(key))) {
            return key;
        }
    }
    return null;
}
public boolean testValue(String value) {...}
```

Repaired Version After Reverse Edit 1

FIG. 7B

```
Compile Successful
```
┌─ 720
```
public String get(Map<String, String> table) {
    for (Map.Entry<String, String> entry : table.entrySet()) {
        String key = entry.getKey();
        if (checkValue(table.get(key))) {
            return key;
        }
    }
    return null;
}
public boolean testValue(String value) {...}
```

Buggy Version After Edits 1, 2, 3

```
Compile Error → Skip
```
┌─ 722
```
public String get(Map<String, String> table) {
    for (String key : table.keySet()) { if (testValue(entry.getValue(key))) {
            return key;
        }
    }
    return null;
}
public boolean testValue(String value) {...}
```

Repaired Version After Reverse Edits 1, 2, 3

FIG. 7C

Compile Successful

```
public String get(Map<String, String> table) {
    for (Map.Entry<String, String> entry : table.entrySet()) {
        String key = entry.getKey();
        if (checkValue(entry.getValue(key))) {
            return key;
        }
    }
    return null;
}
public boolean testValue(String value) {...}
```

Buggy Version After Edits 1, 2, 3, 4

Compile Successful → Found Cluster!

```
public String get(Map<String, String> table) {
    for (String key : table.keySet()) {
        if (testValue(table.get(key))) {
            return key;
        }
    }
    return null;
}
public boolean testValue(String value) {...}
```

Repaired Version After Reverse Edits 1, 2, 3, 4

FIG. 7D

```
Bug Fixed → Ok
```
┌─728
```
public String get(Map<String, String> table) {
    for (Map.Entry<String, String> entry : table.entrySet()) {
        String key = entry.getKey();
        if (checkValue(entry.getValue(key))) {
            return key;
        }
    }
    return null;
}
public boolean testValue(String value) {...}
```

Buggy Version Applying Cluster 1

```
Bug Reproduced → Ok
```
┌─730
```
public String get(Map<String, String> table) {
    for (String key : table.keySet()) { if (testValue(table.get(key))) {
            return key;
        }
    }
    return null;
}
public boolean testValue(String value) {...}
```

Repaired Version After Applying Cluster 1

FIG. 7E

```
Bug Not Fixed → NG
```
─732
```
public String get(Map<String, String> table) {
    for (String key : table.keySet()) { if (testValue(table.get(key))) {
            return key;
        }
    }
    return null;
}
public boolean testValue(String value) {...}
```

Buggy Version Applying Cluster 2

```
Bug Not Reproduced → NG
```
─734
```
public String get(Map<String, String> table) {
    for (Map.Entry<String, String> entry : table.entrySet()) {
        String key = entry.getKey();
        if (checkValue(entry.getValue(key))) {
            return key;
        }
    }
    return null;
}
public boolean checkValue(String value) {...}
```

Repaired Version After Applying Cluster 2

FIG. 7F

Bug Fixed → Ok

```
public String get(Map<String, String> table) {
    for (Map.Entry<String, String> entry : table.entrySet()) {
        String key = entry.getKey();
        if (testValue(entry.getValue(key))) {
            return key;
        }
    }
    return null;
}
public boolean testValue(String value) {...}
```

Buggy Version Applying Valid Clusters 1 and 2

Bug Reproduced → Ok

```
public String get(Map<String, String> table) {
    for (String key : table.keySet()) { if (checkValue(table.get(key))) {
            return key;
        }
    }
    return null;
}
public boolean checkValue(String value) {...}
```

Repaired Version After Applying Valid Clusters 1 and 2

*FIG. 7G*

AUTOMATED SOFTWARE PROGRAM REPAIR

FIELD

The embodiments discussed in the present disclosure are related to automated software program repair.

BACKGROUND

Software programs often have errors in them (commonly referred to as "bugs") in which they may not operate as intended. Often automated repair systems are used in attempt to identify and correct errors in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include identifying a plurality of source code edits made between a buggy version of first source code of a first software program and a repaired version of the first source code. The buggy version includes a first error and the first error has been corrected in the repaired version. The operations may also include identifying a plurality of clusters of the source code edits. Each cluster of the plurality of clusters includes one or more source code edits of the plurality of source code edits. The operations may also include identifying a plurality of valid clusters of the plurality of clusters based on successful compiling of the first source code with respect to each valid cluster of the plurality of valid clusters. In addition, the operations may include identifying one or more invalid clusters of the plurality of clusters based on one or more compiling errors of the first software program with respect to each of the one or more invalid clusters. Moreover, the operations may include identifying, as a first repair of the first error, a particular set of one or more valid clusters of the plurality of valid clusters while excluding the one or more invalid clusters from consideration.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 7A-7G illustrate example source code regarding identifying a repair made to a software program.

DESCRIPTION OF EMBODIMENTS

Figure 1:
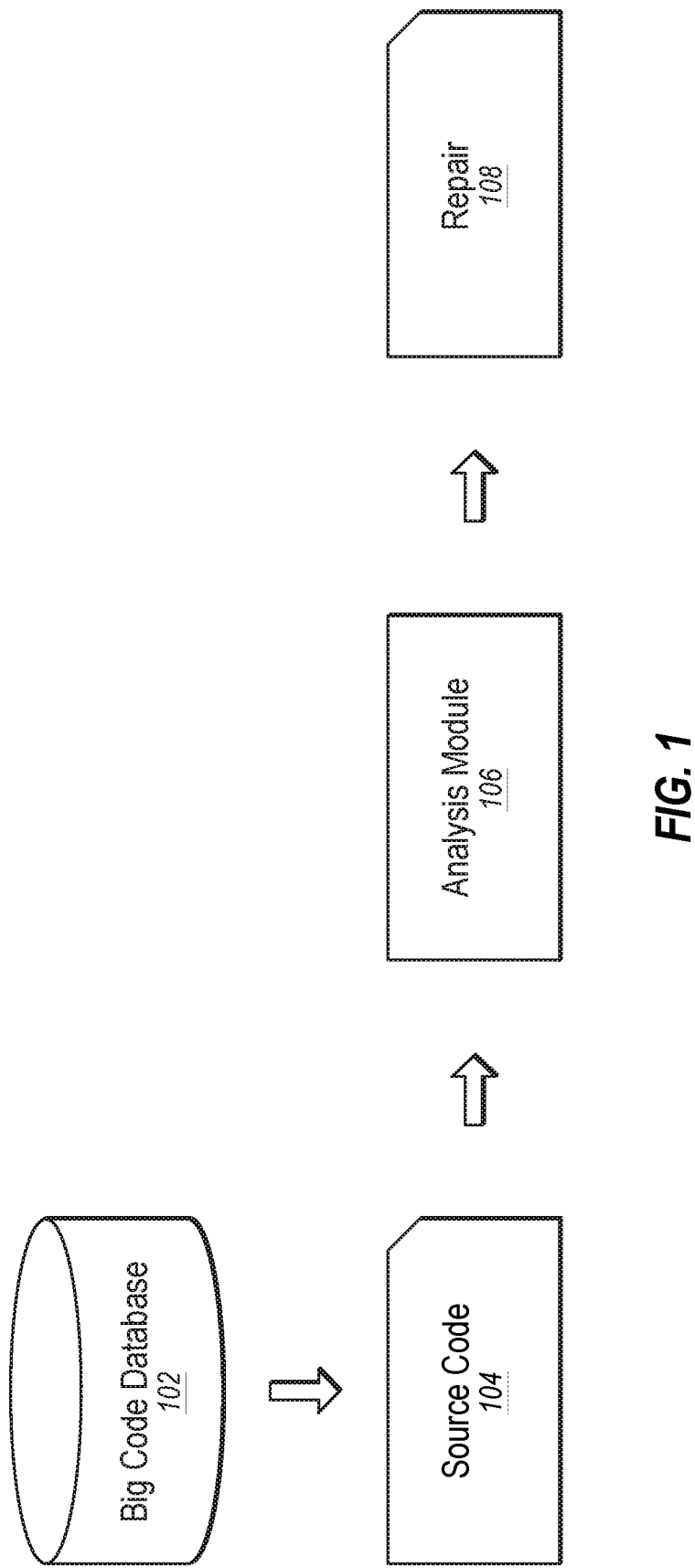
FIG. 1 is a diagram representing an example environment related to identifying repairs made to a software program.

Some embodiments described in the present disclosure relate to methods and systems of repairing software programs. Software programs often include errors (also commonly referred to as "bugs") that may cause the software programs to behave in an unintended manner. Additionally, automated repair systems and techniques are often used to detect and correct errors to repair software programs.

Additionally, repositories of existing software programs may be used to identify edits that were made to the corresponding code to correct errors in the corresponding software program. In some instances, the repositories of existing software programs may include source code of a large number of software programs (e.g., thousands, tens of thousands, hundreds of thousands, millions, etc. of software programs). In the present disclosure, existing software programs and the corresponding source code that are stored in such repositories and that may be used to help develop other software programs may be referred to as "big code."

The big code repositories may include different versions (or sometimes referred to as "iterations") of the source code of the respective software programs in which the different versions are produced through one or more edits made to the source code. In some instances, the different versions of the source code may include a buggy version of the source code that includes a particular error. Further, the different versions may also include a corresponding repaired version of the source code that has repaired the particular error. In the present disclosure, reference to a "repaired version" of source code does not necessarily mean that all errors in the source code have been repaired, but that an error has been repaired. The repaired version may include multiple edits as compared to the buggy version, however, not all of the edits may have contributed to repairing the particular error or affecting the underlying functionality of the corresponding software program. In the present disclosure, edits identified as contributing to repairing errors are referred to as "primary edits." Further, edits identified as not contributing to repairing errors or that may not change the underlying functionality of the corresponding source code may be referred to as "secondary edits". For example, secondary edits be include edits made for cosmetic modifications (e.g., to improve readability) or edits that may be used for debugging purposes.

According to one or more embodiments of the present disclosure, operations may be performed to identify a repair of an error in which the repair includes edits made between a buggy version of code that includes the error and a corresponding repaired version of the code that has corrected the error. The identifying of the edits of the repair may be such that the number of secondary edits included in the repair may be reduced, minimized, or eliminated. The reduction in secondary edits may help provide better repair examples derived from existing source code that may be useful for the development and testing of other source code.

According to one or more embodiments of the present disclosure, the technological field of software development may be improved by configuring a computing system to identify and extract the primary edits used to repair software programs as compared to secondary edits that may also be included in the corresponding source code. Such a configuration may allow the computing system to better identify and extract repair examples from big code.

In these or other embodiments, the computing system may be configured to use the extracted repair examples with respect to testing and/or developing other software programs. For example, the computing system may be configured to identify, in the big code, code patterns associated with the extracted repair examples. In these or other embodiments, the identified code patterns may be used to select or implement repairs of the repair examples (e.g., to select or implement repairs with similar code patterns) with respect to the code under test in response to the identified code patterns of the repair examples being the same or similar to code patterns associated with the code under test. For example, U.S. patent application Ser. No. 15/822,106 filed on Nov. 24, 2017 and U.S. patent application Ser. No. 15/915,894 filed on Mar. 8, 2018, which are both incorporated by reference herein in their entireties, discuss the use of code patterns in existing source code to implement repairs in other source code.

Embodiments of the present disclosure are explained with reference to the accompanying drawings.

FIG. 1 is a diagram representing an example environment 100 related to identifying a repair made to source code of a software program, arranged in accordance with at least one embodiment described in the present disclosure. The environment 100 may include an analysis module 106 configured to analyze source code 104 of the software program to identify a repair 108 made with respect to the source code 104.

The source code 104 may include electronic data, such as, for example, the software program, code of the software program, libraries, applications, scripts, or other logic or instructions for execution by a processing device. In some embodiments, the source code 104 may include a complete instance of the software program. Additionally or alternatively, the source code 104 may include a portion of the software program. The source code 104 may be written in any suitable type of computer language that may be used for the software program.

In some embodiments, the source code 104 may include multiple versions of the code of the software program. For example, multiple edits may be made to the source code 104 as updates, patches, platform migrations, bug fixes, cosmetic rearrangement, etc. The multiple edits may thus result in two or more different versions of the source code 104. In these or other embodiments, the source code 104 may include two or more of such versions of the code of the software program in which one or more differences may exist between the different versions due to edits made between the iterations. Additionally, reference to an "edit" to source code in the present disclosure may include any number of modifications that may be made to one or more lines of code. For example, an edit may range from something as simple as a single element name change, element addition, or element deletion in a single line of code to something as complex as introducing or deleting a large number of lines of code. In some embodiments, the source code 104 may include a buggy version of the code that may include a particular error. Further, the source code 104 may include a corresponding repaired version of the code with one or more primary edits that corrected the particular error of the buggy version. The corresponding repaired version may also include one or more secondary edits that did not contribute to correcting the particular error of the buggy version. The repair 108 may include the primary edits made with respect to the particular error and may exclude one or more of the secondary edits of the repaired version of the code.

The analysis module 106 may include code and routines configured to enable a computing device to perform one or more operations with respect to the source code 104 to identify the repair 108. Additionally or alternatively, the analysis module 106 may be implemented using hardware including a processor, a microprocessor (e.g., to perform or control performance of one or more operations), a field-programmable gate array (FPGA), or an application-specific integrated circuit (ASIC). In some other instances, the analysis module 106 may be implemented using a combination of hardware and software. In the present disclosure, operations described as being performed by the analysis module 106 may include operations that the analysis module 106 may direct a corresponding system to perform. The analysis module 106 may be configured to perform a series of operations with respect to the source code 104 that may be used to reduce, minimize, or eliminate secondary edits that may be included in the repair 108 as follows below.

The analysis module 106 may be configured to obtain the source code 104, including multiple versions of the source code 104, such as one or more buggy versions and one or more corresponding repaired versions of the source code 104. In some embodiments, the analysis module 106 may be configured to obtain the source code 104 from a big code database 102. The big code database 102 may be a repository of existing software programs and their respective source code. In these or other embodiments, the big code database 102 may include different versions of the source code 104, such as buggy and corresponding repaired versions. Additionally or alternatively, the big code database 102 may be made available for analysis, which may help facilitate the development and debugging of other software programs.

In some embodiments, the analysis module 106 may be configured to identify edits that are made between the buggy version of the source code 104 and the corresponding repaired version of the source code. The identified edits may include one or more primary edits that correct a particular error that is in the buggy version and that is corrected in the repaired version.

In some embodiments as part of identifying the repair 108, the analysis module 106 may be configured to organize the edits into clusters in which each cluster may include one or more edits. In these or other embodiments, the total number of clusters may include different clusters for every possible unordered combination of the edits. For example, the edits may include a first edit "A", a second edit "B", and a third edit "C". The clusters may accordingly be as follows: {A}, {B}, {C}, {A,B}, {A,C}, {B,C}, and {A,B,C}.

The analysis module 106 may be configured to identify the repair 108 from one or more of the clusters of edits. Additionally or alternatively, the analysis module 106 may be configured to identify as the repair 108, the cluster or combination of clusters with the smallest number of total edits that also correct the particular error. The analysis module 106 may be configured to perform one or more operations of methods 300, 500, and/or 600 described in detail below with respect to FIGS. 3, 5, and 6, respectively, to identify the repair 108.

Modifications, additions, or omissions may be made to FIG. 1 without departing from the scope of the present disclosure. For example, the environment 100 may include more or fewer elements than those illustrated and described in the present disclosure.

Figure 2:
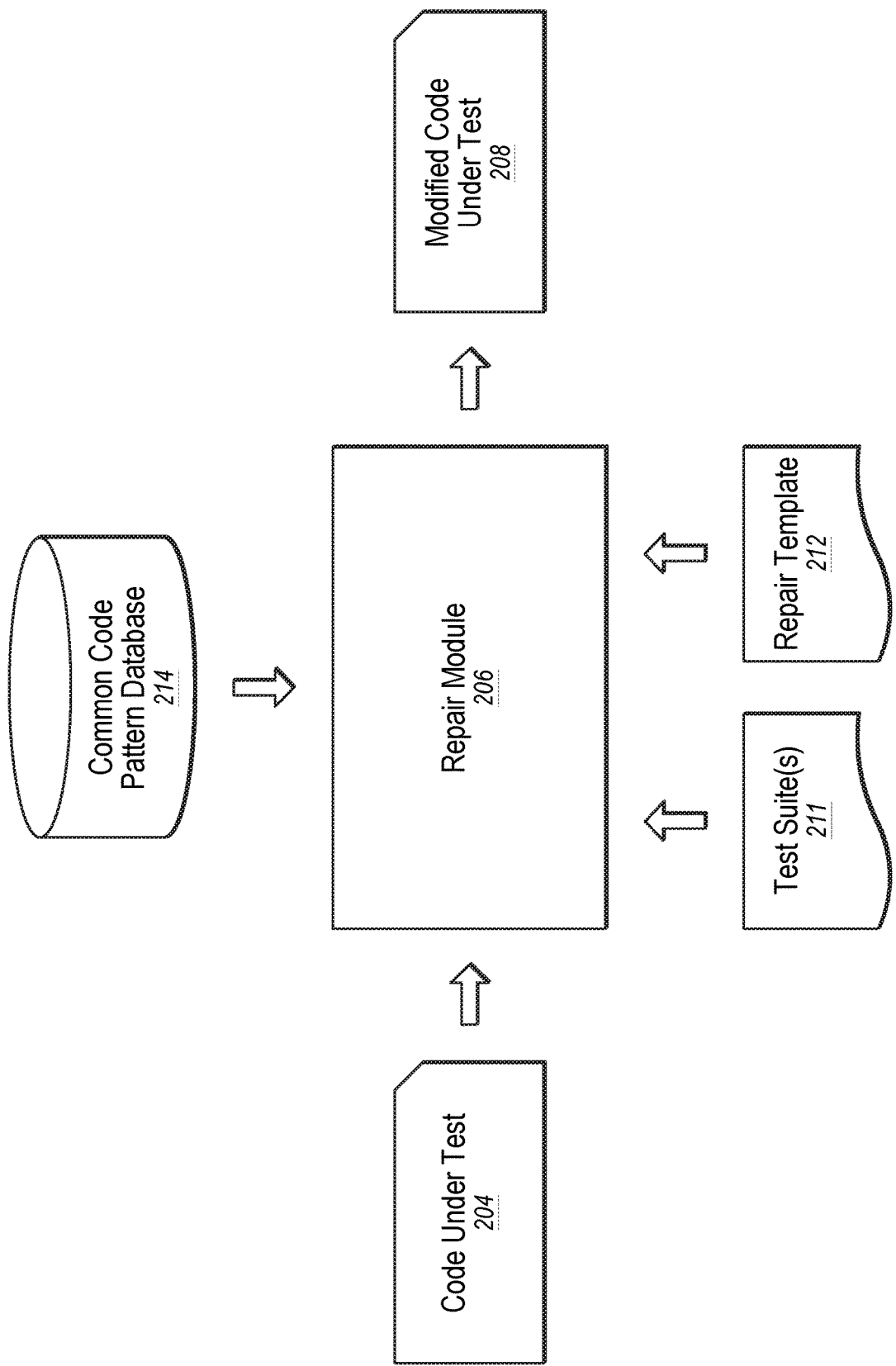
FIG. 2 is a diagram representing an example environment related to repairing a software program.

FIG. 2 is a diagram representing an example environment 200 related to repairing a software program, arranged in accordance with at least one embodiment described in the present disclosure. The environment 200 may include a repair module 206 configured to analyze code under test 204 for errors. The repair module 206 may also be configured to output modified code under test 208, which may include one or more modifications made to the code under test 204 by repair operations performed by the repair module 206.

The code under test 204 may include electronic data, such as, for example, the software program, source code of the software program, libraries, applications, scripts, or other logic or instructions for execution by a processing device. In some embodiments, the code under test 204 may include a complete instance of the software program. Additionally or alternatively, the code under test 204 may include a portion of the software program. The code under test 204 may be written in any suitable type of computer language that may be used for the software program.

The repair module 206 may include code and routines configured to enable a computing device to perform one or more modifications of the code under test 204 to generate the modified code under test 208. Additionally or alternatively, the repair module 206 may be implemented using hardware including a processor, a microprocessor (e.g., to perform or control performance of one or more operations), a field-programmable gate array (FPGA), or an application-specific integrated circuit (ASIC). In some other instances, the repair module 206 may be implemented using a combination of hardware and software. In the present disclosure, operations described as being performed by the repair module 206 may include operations that the repair module 206 may direct a corresponding system to perform.

The repair module 206 may be configured to perform a series of repair operations with respect to the code under test 204 that may be used to repair (also referred to as correct) one or more errors in the code under test 204. In some embodiments, the repair module 206 may be configured to perform one or more of the repair operations based on a repair template 212 and one or more test suites 211.

The repair template 212 may include any suitable type of instructions or routines that, when executed, may be configured to implement one or more modifications with respect to the code under test 204 in response to the presence of errors in the code under test 204. The modifications may include changes in the code under test 204 that may repair or attempt to repair the errors. In the present disclosure, the modifications that may be performed may be referred to as "repair candidates" or "repairs." In some embodiments, the repair template 212 may include one or more repairs identified from previously repaired source code by identifying primary edits made to accomplish the repair. For example, the repair template 212 may include the repair 108 of FIG. 1 that may be identified by the analysis module 106.

The test suites 211 may include one or more routines that may act as test cases for the code under test 204. The test suites 211 may be configured to determine whether the code under test 204 behaves in a specified manner. The test suites 211 may be configured according to any suitable technique.

The repair module 206 may be configured to apply one or more of the test suites 211 with respect to the code under test 204 to detect or determine one or more errors and corresponding error locations in the code under test 204. In some embodiments, the repair module 206 may be configured to execute one or more tests included in the test suites 211, which may be referred to as performing a test execution. A test execution that passes may be referred to as a "passing test execution" and a test execution that fails may be referred to as a "failing test execution." In some embodiments, an error location and corresponding error of the code under test 204 may be identified based on a failing test execution executing code appearing at the error location.

In some embodiments, the repair module 206 may be configured to obtain a repair candidate from the repair template 212 as a potential modification that may be made to repair a detected error. In some embodiments, the repair module 206 may obtain a repair code pattern of the repair candidate. For example, in some embodiments, the repair module 206 may be configured to obtain the repair code pattern such as described in U.S. patent application Ser. No. 15/822,106.

In some embodiments, the repair module 206 may be configured to access a common code pattern database 214. The common code pattern database 214 may include common code patterns that may be derived from big code. For example, the common code patterns may be derived from existing code of existing software programs that may be stored in one or more repositories of existing software programs. In some embodiments, the common code patterns may be obtained such as described in U.S. patent application Ser. No. 15/822,106.

In some embodiments, the repair module 206 may be configured to select or prioritize repair candidates for the correction of error based on associations between code patterns of the repair candidates and the common code patterns such as described in U.S. patent application Ser. No. 15/822,106.

In some embodiments, the repair module 206 may also be configured to perform repairs on the code under test 204 based on the prioritization of the repair candidates. For example, the repair module 206 may implement as potential repairs, the repair candidates in descending order from highest prioritization to lowest prioritization. Additionally or alternatively, the repair module 206 may be configured to output the modified code under test 208, which may include one or more repairs that may be implemented based on the prioritization of the repair candidates.

Modifications, additions, or omissions may be made to FIG. 2 without departing from the scope of the present disclosure. For example, the environment 200 may include more or fewer elements than those illustrated and described in the present disclosure. In addition, in some embodiments, one or more routines, one or more instructions, or at least a portion of code of the repair module 206, the test suites 211, and the repair template 212 may be combined such that they may be considered the same element or may have common sections that may be considered part of two or more of the repair module 206, the test suites 211, and the repair template 212.

Figure 3:
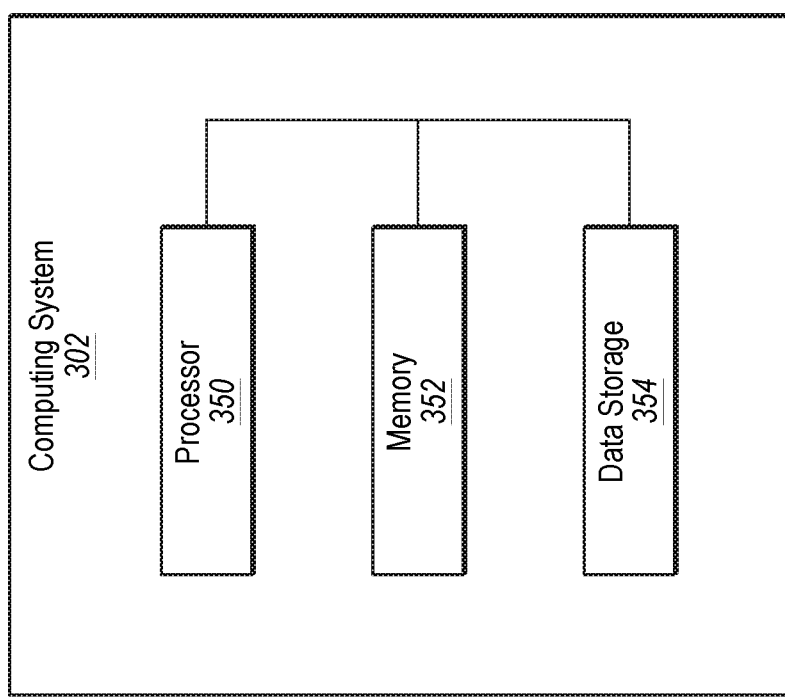
FIG. 3 illustrates a block diagram of an example computing system.

FIG. 3 illustrates a block diagram of an example computing system 302, according to at least one embodiment of the present disclosure. The computing system 302 may be configured to implement or direct one or more operations associated with an analysis module (e.g., the analysis module 106 of FIG. 1 and/or a repair module (e.g., the repair module 206 of FIG. 2). The computing system 302 may include a processor 350, a memory 352, and a data storage 354. The processor 350, the memory 352, and the data storage 354 may be communicatively coupled.

In general, the processor 350 may include any suitable special-purpose or general-purpose computer, computing entity, or processing device including various computer hardware or software modules and may be configured to execute instructions stored on any applicable computer-readable storage media. For example, the processor 350 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, the processor 350 may include any number of processors configured to, individually or collectively, perform or direct performance of any number of operations described in the present disclosure. Additionally, one or more of the processors may be present on one or more different electronic devices, such as different servers.

In some embodiments, the processor 350 may be configured to interpret and/or execute program instructions and/or process data stored in the memory 352, the data storage 354, or the memory 352 and the data storage 354. In some embodiments, the processor 350 may fetch program instructions from the data storage 354 and load the program instructions in the memory 352. After the program instructions are loaded into memory 352, the processor 350 may execute the program instructions.

For example, in some embodiments, one or more of the above mentioned modules (e.g., the analysis module and/or the repair module) may be included in the data storage 354 as program instructions. The processor 350 may fetch the program instructions of a corresponding module from the data storage 354 and may load the program instructions of the corresponding module in the memory 352. After the program instructions of the corresponding module are loaded into memory 352, the processor 350 may execute the program instructions such that the computing system may implement the operations associated with the corresponding module as directed by the instructions.

The memory 352 and the data storage 354 may include computer-readable storage media for carrying or having computer-executable instructions or data structures stored thereon. Such computer-readable storage media may include any available media that may be accessed by a general-purpose or special-purpose computer, such as the processor 350. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 350 to perform a certain operation or group of operations.

Modifications, additions, or omissions may be made to the computing system 302 without departing from the scope of the present disclosure. For example, in some embodiments, the computing system 302 may include any number of other components that may not be explicitly illustrated or described.

Figure 4:
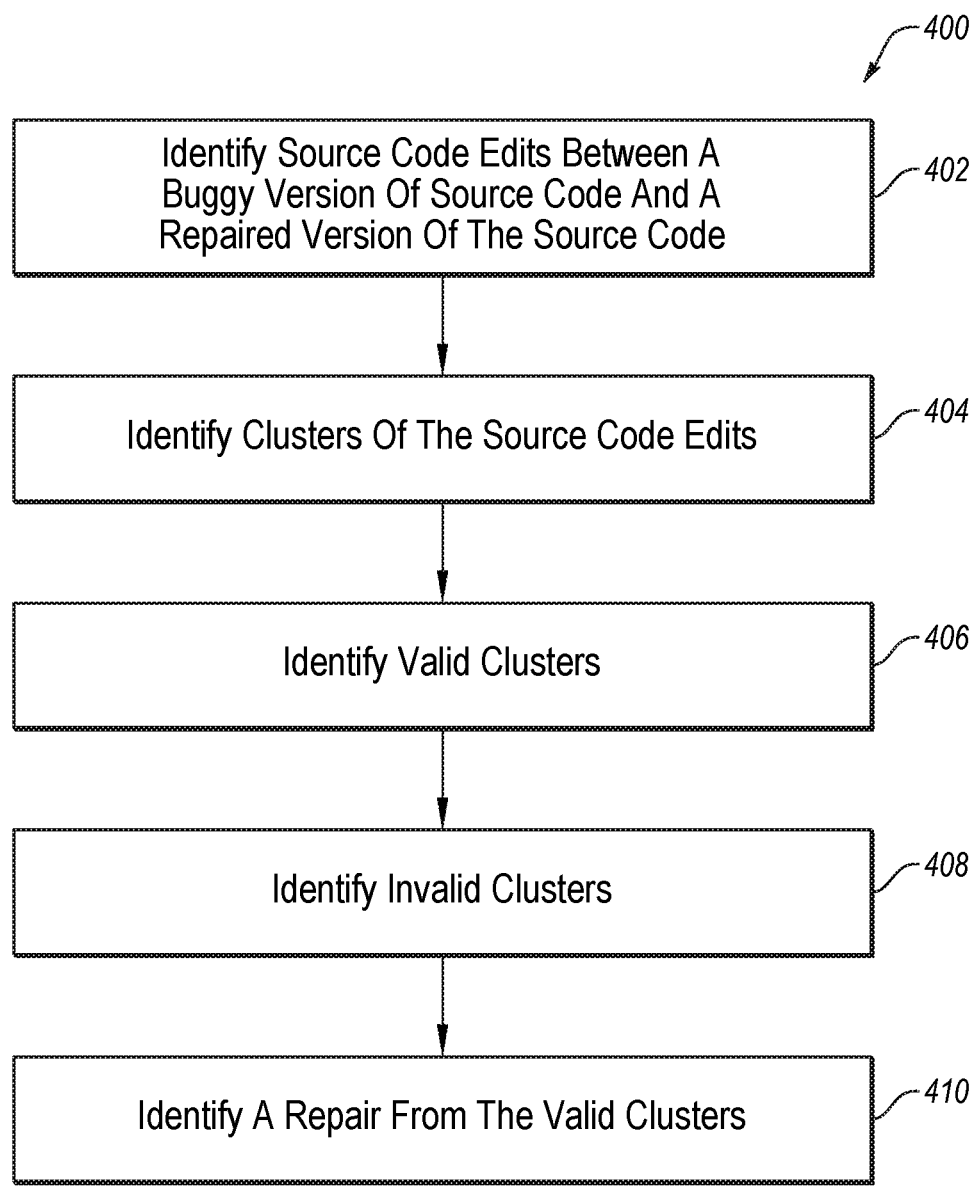
FIG. 4 is a flowchart of an example method of identifying a repair made to a software program.

FIG. 4 is a flowchart of an example method 400 of identifying a repair to a software program, according to at least one embodiment described in the present disclosure. The method 400 may be performed by any suitable system, apparatus, or device with respect to code under test. For example, one or more of the analysis module 106 of FIG. 1 and the repair module 206 of FIG. 2 or the computing system 302 of FIG. 3 (e.g., as directed by one or more modules) may perform one or more of the operations associated with the method 400. Although illustrated with discrete blocks, the steps and operations associated with one or more of the blocks of the method 500 may be divided into additional blocks, combined into fewer blocks, or eliminated, depending on the particular implementation.

The method 400 may begin at block 402, where source code edits of source code of a software program may be identified. The edits may be made between a buggy version of the source code and a corresponding repaired version of the source code. The buggy version may include a particular error, and the repaired version may be corrected in the repaired version. The source code and corresponding versions may be obtained from a big code repository in some embodiments.

At block 404, clusters of the edits may be identified. For example, the edits may be organized into clusters in which each cluster may include one or more edits. As described above with respect to the analysis module 106 organizing edits into clusters, in some embodiments, the total number of clusters may include a different cluster for each different unordered combination of clusters.

At block 406, one or more valid clusters may be identified from the clusters identified at block 404. The valid clusters may be identified based on successful compiling of the first source code with respect to each of the one or more valid clusters. The valid clusters may be identified according to one or more operations of the method 500 described with respect to FIG. 5 in further detail below.

At block 408, one or more invalid clusters may be identified from the clusters identified at block 404. The invalid clusters may be identified based on one or more compiling errors of the first software program with respect to each of the one or more invalid clusters. The invalid clusters may be identified according to one or more operations of the method 500 described with respect to FIG. 5 in further detail below.

At block 410, a repair of the error of the buggy version of source code may be identified from the valid clusters. In some embodiments, a set of valid clusters and the edits that correspond to the set may be identified as the repair. The set of valid clusters may include a single valid cluster or a combination of two or more valid clusters. In these or other embodiments, the set of valid clusters may be a particular valid cluster or a particular combination of valid clusters with the smallest number of total edits that also correct the first error. Moreover, identification of the repair may exclude consideration of the invalid clusters that are identified at block 408. The repair may be identified from the valid clusters according to one or more operations of the method 600 described with respect to FIG. 6 in further detail below.

Modifications, additions, or omissions may be made to the method 400 without departing from the scope of the present disclosure. For example some of the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the source code that is analyzed in the method 400 may be first source code and the error in the buggy version of the first source code may be a first error. In these or other embodiments, the method 400 may include identifying a second error in second source code of a second software program. The second error may be of a same type of error as the first error. Additionally or alternatively, the second error may be repaired based on the repair identified at block 410 based on the second error being of the same type as the first error and based on the identified repair correcting the first error.

Figure 5:
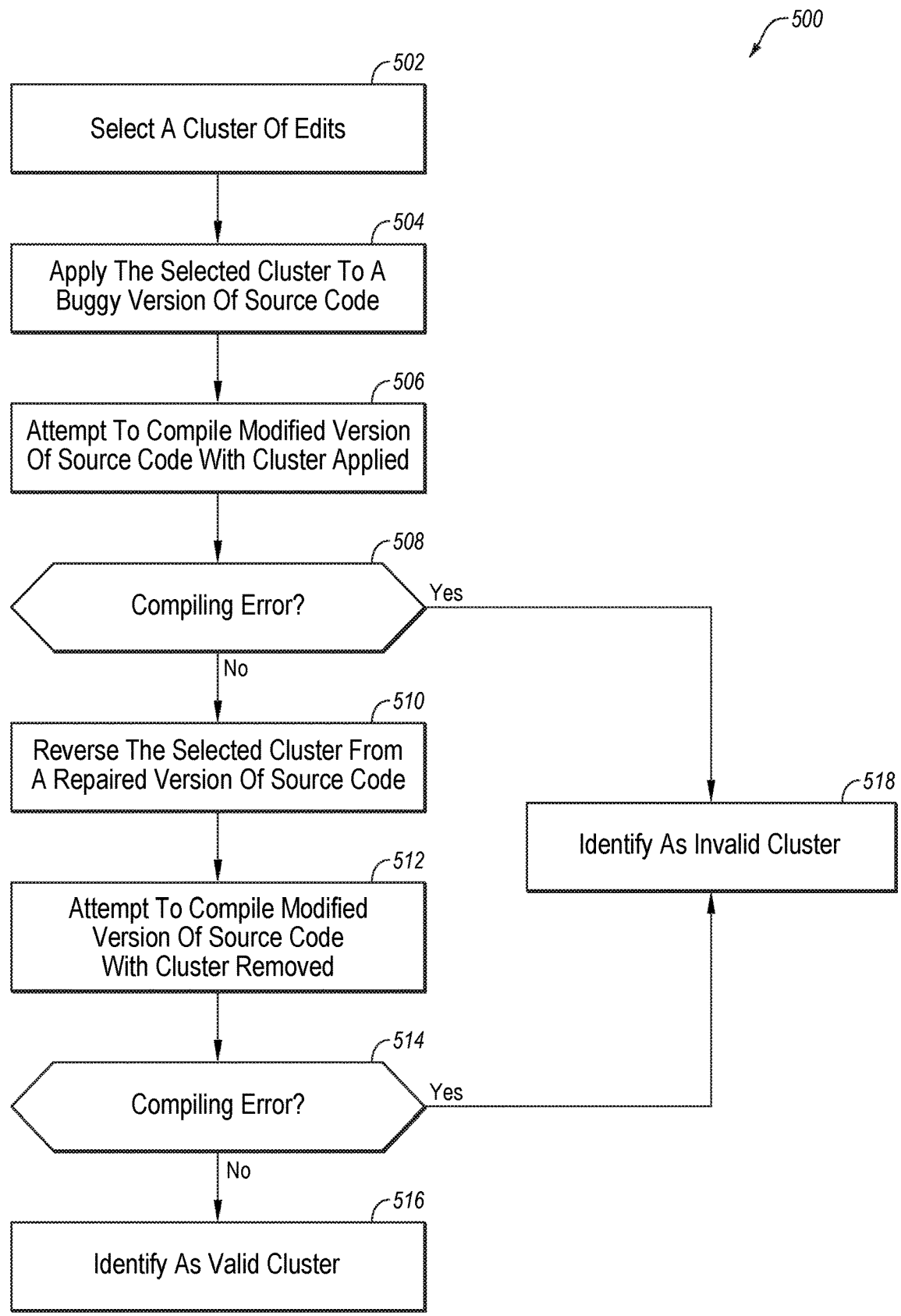
FIG. 5 is a flowchart of an example method of identifying valid and/or invalid clusters of edits.

FIG. 5 is a flowchart of an example method 500 of identifying valid and/or invalid clusters of edits, according to at least one embodiment described in the present disclosure. In some embodiments, one or more of the operations of blocks 406 and 406 described above with respect to the method 400 of FIG. 4 may be performed according to the method 500.

The method 500 may be performed by any suitable system, apparatus, or device with respect to code under test. For example, one or more of the analysis module 106 of FIG. 1 and the repair module 206 of FIG. 2 or the computing system 302 of FIG. 3 (e.g., as directed by one or more modules) may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may begin at block 502, at which a particular cluster of edits may be selected. The particular cluster may be selected from the clusters identified at block 404 of the method 400 of FIG. 4 in some embodiments. As indicated above, the edits of the particular cluster may be edits that are made between a buggy version of source code that include an error and a repaired version of the source code in which the error has been corrected.

At block 504, the particular cluster may be applied to the buggy version of the source code to generate a first modified version of the source code. For example, the edits that are included in the particular cluster may be made to the buggy version of the source code to generate the first modified version.

At block 506, an attempt may be made to compile the first modified version of the source code. At block 508, it may be determined whether the first modified version successfully compiled or included one or more compilation errors. In response to the first modified version having one or more compiling errors, the method 500 may proceed to block 518. At block 518, the particular cluster may be identified as an invalid cluster. By contrast, in response to the first modified version successfully compiling (i.e., not having any compiling errors), the method 500 may proceed to block 510.

At block 510, the particular cluster may be reversed from the repaired version of the source code to generate a second modified version of the source code. For example, the edits that are included in the particular cluster may be reversed from the repaired version such that the corresponding code is as it was in the buggy version. For instance, a first edit that changes a first variable name in the buggy version to a second variable name in the repaired version may be reversed such that the second modified version includes the first variable name instead of the second variable name. Further, edits that were made between the buggy version and the repaired version that are not included in the selected cluster may not be reversed.

At block 512, an attempt may be made to compile the second modified version of the source code. At block 514, it may be determined whether the second modified version successfully compiled or included one or more compilation errors. In response to the second modified version having one or more compiling errors, the method 500 may proceed to block 518 and the particular cluster may be identified as an invalid cluster. By contrast, in response to the second modified version successfully compiling (i.e., not having any compiling errors), the method 500 may proceed to block 516. At block 516, the particular cluster may be identified as a valid cluster.

Modifications, additions, or omissions may be made to the method 500 without departing from the scope of the present disclosure. For example, the operations of method 500 may be implemented in differing order. For instance, in some embodiments, blocks 510, 512, and 514 may be performed prior to or concurrently with blocks 504, 506, and 508 in some embodiments.

Further, in some embodiments, the method 500 may be performed iteratively or concurrently with respect to each cluster of edits that may be identified at block 404 of FIG. 4. Additionally or alternatively, the method 500 may be performed iteratively in which the clusters are selected in ascending order according to their size. In these or other embodiments, a cluster with the smallest number of edits may be selected first and a cluster with the greatest number of edits may be selected last.

Figure 6:
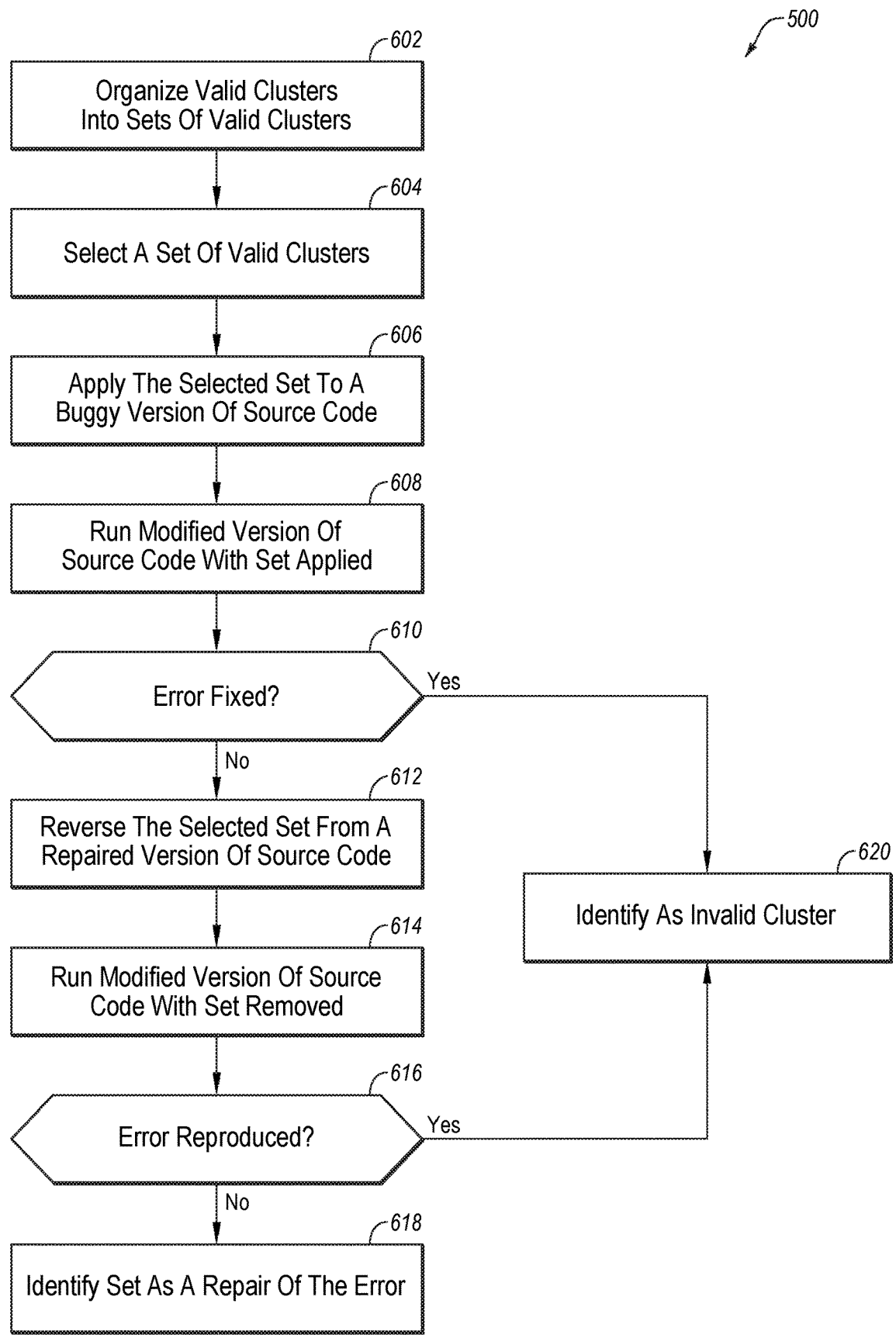
FIG. 6 is a flowchart of an example method of identifying a repair from valid clusters of edits.

FIG. 6 is a flowchart of an example method 600 of identifying valid and/or invalid clusters of edits, according to at least one embodiment described in the present disclosure. In some embodiments, one or more of the operations of block 410 described above with respect to the method 400 of FIG. 4 may be performed according to the method 600.

The method 600 may be performed by any suitable system, apparatus, or device with respect to code under test. For example, one or more of the analysis module 106 of FIG. 1 and the repair module 206 of FIG. 2 or the computing system 302 of FIG. 3 (e.g., as directed by one or more modules) may perform one or more of the operations associated with the method 600. Although illustrated with discrete blocks, the steps and operations associated with one or more of the blocks of the method 600 may be divided into additional blocks, combined into fewer blocks, or eliminated, depending on the particular implementation.

The method 600 may begin at block 602, at which the valid clusters may be organized into sets of valid clusters. For example, the valid clusters may be organized into sets of valid clusters in which each set of valid clusters may include one or more valid clusters. Each set of valid clusters may include a single valid cluster or multiple valid clusters. The total number of sets of valid clusters may include a different set for each different unordered combination of valid clusters, similar to the manner in which the edits may be organized into clusters such as described above.

At block 604, a particular set of valid clusters may be selected. In some embodiments, the method 600 may be performed iteratively, and the particular set of valid clusters may be selected based on ascending order of size of the sets of valid clusters. As such, the particular set of valid clusters that is selected at block 604 may be a set with the smallest number of corresponding edits as compared to other sets that have not yet been analyzed via the method 600.

At block 606, the particular set may be applied to the buggy version of the source code to generate a first modified version of the source code. For example, the edits that are included in the particular set may be made to the buggy version of the source code to generate the first modified version.

At block 608, the first modified version of the source code may be run. At block 610, it may be determined, based on the running of the first modified version, whether the error that is in the buggy version and corrected in the repaired version has been fixed in the first modified version. In response to the error not being fixed, the method 600 may proceed to block 620. At block 520, the particular set of valid clusters may be removed from consideration as a standalone repair of the error. By contrast, in response to the first modified version successfully fixing the error, the method 600 may proceed to block 612.

At block 612, the particular set may be reversed from the repaired version of the source code to generate a second modified version of the source code. For example, the edits that are included in the particular set of valid clusters may be reversed from the repaired version such that the corresponding code is as it was in the buggy version. As with the block 510 of FIG. 5, edits that were made between the buggy version and the repaired version that are not included in the selected cluster may not be reversed at block 612.

At block 614, the second modified version of the source code may be run. At block 616, it may be determined, based on running of the second modified version, whether the error that was originally in the buggy version has been reproduced by the second modified version. In response to the second modified version not reproducing the error, the method 600 may proceed to block 620 and the particular set may be removed from consideration as a standalone repair of the error. By contrast, in response to the second modified version reproducing the error, the method 600 may proceed to block 618. At block 618, the particular set of valid clusters may be identified as a standalone repair of the error.

In some embodiments, more than one set of valid clusters may be identified as a standalone repair of the error by repeating the operations of blocks 604, 606, 608, 610, 612, 614, 616, 618, and 620 with respect to each of multiple of the sets of valid clusters. However, one or more of the sets of valid clusters identified as a standalone repair may also include secondary edits that may not contribute to repairing the error. In some embodiments, the set of valid clusters with the smallest number of edits that is also identified as a standalone repair may be selected as the repair of the error to identify a repair with the least number of secondary edits (which may include no secondary edits in some instances). As such, the number of secondary edits in the repair may be reduced.

Additionally or alternatively, the operations of blocks 604, 606, 608, 610, 612, 614, 616, 618, and 620 may be performed iteratively with respect to sets of valid clusters in which the sets of valid clusters are selected in ascending order based on their size (e.g., the number of edits in the sets of valid clusters). In these or other embodiments, in response to identifying the first set of valid clusters that repairs the errors, the iterative process may be terminated. Performing the method 600 in this manner may reduce the amount of computing resources used while also identifying a set of valid clusters with a smallest number of edits (which may also have the smallest number of secondary edits) that also is a standalone repair of the error.

Modifications, additions, or omissions may be made to the method 600 without departing from the scope of the present disclosure. For example, the operations of method 600 may be implemented in differing order. For instance, in some embodiments blocks 612, 614, and 616 may be performed prior to or concurrently with blocks 606, 608, and 610 in some embodiments.

FIGS. 7A-7E are now discussed to provide an example as to how one or more of the operations of the methods 400, 500, and 600 may be performed with respect to an example buggy version 702 of source code and an example repaired version 704 of the source code. In the illustrated example, six edits-Edit 1, Edit 2, Edit 3, Edit 4, Edit 5, and Edit 6 (referred to generically as "the Edits")—may have been made between the buggy version 702 and the repaired version 704. In particular, as illustrated in FIG. 7A, Edit 1 may have changed the element "String key" in line 708 of the source code to "Map.Entry<String, String> entry"; Edit 2 may have changed the element "keySet( )" in line 708 to "entrySet( )"; Edit 3 may have added the line 710 of "String key=entry.getKey( )"; Edit 4 may have changed the element "checkValue" in line 712 to "testValue"; Edit 5 may have changed the element "table.get" in line 712 to "entry.getValue"; and Edit 6 may have changed the elemetn "checkValue" of line 714 to "testValue".

Further, the repaired version 704 may have corrected an error that is in the buggy version 702. The operations of the methods 400, 500, and 600 may be performed by a computing system to determine which of the Edits contributed to correcting the error (e.g., which are primary edits) and which of the Edits may be secondary edits.

The Edits may be organized into clusters of edits in which each cluster may include one or more edits. In some embodiments, the total number of clusters may be the total number of different unordered combinations of clusters, which may be equal to 63 different clusters with respect to the 6 Edits.

The clusters of edits may then be identified as being valid or invalid, such as by performing one or more of the operations of the method 500 with respect to the individual clusters. For example, FIG. 7B illustrates a first modified version 716 of the source code in which the cluster of {Edit 1} has been applied to the buggy version 702 of FIG. 7A, such as described above with respect to block 504 of the method 500 of FIG. 5. FIG. 7B also illustrates a second modified version 718 of the source code in which the cluster {Edit 1} has been reversed from the repaired version 704, such as described above with respect to block 510 of the method 500 of FIG. 5. As indicated in FIG. 7B, the first modified version 716 and the second modified version 718 may each have compiling errors such that the cluster of {Edit 1} may be deemed as invalid based on blocks 506, 508, and 518; and/or blocks 512, 514, and 518 of the method 500 of FIG. 5.

As another example, FIG. 7C illustrates a first modified version 720 of the source code in which the cluster of {Edit 1, Edit 2, Edit 3} has been applied to the buggy version 702 of FIG. 7A, such as described above with respect to block 504 of the method 500 of FIG. 5. FIG. 7C also illustrates a second modified version 722 of the source code in which the cluster {Edit 1, Edit 2, Edit 3} has been reversed from the repaired version 704, such as described above with respect to block 510 of the method 500 of FIG. 5. As indicated in FIG. 7C, the first modified version 720 may have compiled successfully but the second modified version 722 may have compiling errors. Therefore, the cluster of {Edit 1, Edit 2, Edit 3} may be deemed as invalid based on blocks 504, 506, 508, 510, 512, 514, and 518 of the method 500 of FIG. 5 even though the first modified version successfully compiled because the second modified version 722 has one or more compiling errors.

As another example, FIG. 7D illustrates a first modified version 724 of the source code in which the cluster of {Edit 1, Edit 2, Edit 3, Edit 4} has been applied to the buggy version 702 of FIG. 7A, such as described above with respect to block 504 of the method 500 of FIG. 5. FIG. 7D also illustrates a second modified version 726 of the source code in which the cluster {Edit 1, Edit 2, Edit 3, Edit 4} has been reversed from the repaired version 704, such as described above with respect to block 510 of the method 500 of FIG. 5. As indicated in FIG. 7D, the first modified version 724 and the second modified version 726 may have each compiled successfully. Therefore, the cluster of {Edit 1, Edit 2, Edit 3, Edit 4} may be deemed as valid based on blocks 504, 506, 508, 510, 512, 514, and 516 of the method 500 of FIG. 5.

The above are merely examples of application of the method 500 to some of the clusters of the Edits. In some embodiments, the method 500 may be performed with respect to each different cluster to identify valid and invalid clusters. In the illustrated example, two valid clusters of the Edits may be identified: Valid Cluster 1-{Edit 1, Edit 2, Edit 3, Edit 4}; and Valid Cluster 2-{Edit 5, Edit 6}.

One or more operations of the method 600 may then be applied to identified Valid Clusters 1 and 2. For example, Valid Clusters 1 and 2 may be organized into the following sets of valid clusters such as described above with respect to block 602 of the method 600: {Valid Cluster 1}, {Valid Cluster 2}, and {Valid Cluster 1, Valid Cluster 2}.

One or more operations of the other blocks of method 600 may then be applied to the sets of valid clusters identified at block 602. For example, FIG. 7E illustrates a first modified version 728 of the source code in which the set {Valid Cluster 1} has been applied to the buggy version 702 of FIG. 7A, such as described above with respect to block 606 of the method 600 of FIG. 6. FIG. 7E also illustrates a second modified version 730 of the source code in which the set {Valid Cluster 1} has been reversed from the repaired version 704, such as described above with respect to block 612 of the method 600 of FIG. 5. As indicated in FIG. 7E, the first modified version 728 may correct the error and the second modified version 730 may reproduce the error. As such, the set {Valid Cluster 1} may be identified as a repair of the error based on blocks 604-618 of the method 600 of FIG. 6.

As another example, FIG. 7F illustrates a first modified version 732 of the source code in which the set {Valid Cluster 2} has been applied to the buggy version 702 of FIG. 7A, such as described above with respect to block 606 of the method 600 of FIG. 6. FIG. 7E also illustrates a second modified version 734 of the source code in which the set {Valid Cluster 2} has been reversed from the repaired version 704, such as described above with respect to block 612 of the method 600 of FIG. 5. As indicated in FIG. 7F, the first modified version 732 may not correct the error and the second modified version 734 may not reproduce the error. As such, the set {Valid Cluster 2} may not be identified as a repair of the error based on blocks 604-618 of the method 600 of FIG. 6.

As another example, FIG. 7G illustrates a first modified version 736 of the source code in which the set {Valid Cluster 1, Valid Cluster 2} has been applied to the buggy version 702 of FIG. 7A, such as described above with respect to block 606 of the method 600 of FIG. 6. FIG. 7G also illustrates a second modified 738 of the source code in which the set {Valid Cluster 1, Valid Cluster 2} has been reversed from the repaired version 704, such as described above with respect to block 612 of the method 600 of FIG. 5. As indicated in FIG. 7G, the first modified version 736 may correct the error and the second modified version 738 may reproduce the error. As such, the set {Valid Cluster 1, Valid Cluster 2} may be identified as a repair of the error based on blocks 604-618 of the method 600 of FIG. 6.

In some embodiments, with respect to the example of FIGS. 7A-7G, the set {Valid Cluster 1} may be selected as the repair instead of the set {Valid Cluster 1, Valid Cluster 2} because the set {Valid Cluster 1} may have fewer edits. Further, given that the set {Valid Cluster 1, Valid Cluster 2} already includes the set {Valid Cluster 1}, which may operate as the repair, it may be determined that the edits of Valid Cluster 2 are secondary edits with respect to the error. The application of methods 400, 500, and 600 may thus identify the Edits 1, 2, 3, and 4 as the repair, while omitting the Edits 5 and 6, which may improve the quality of the identified repair as compared to if the Edits 5 and 6 were included.

As indicated above, the embodiments described in the present disclosure may include the use of a special purpose or general purpose computer including various computer hardware or software modules, as discussed in greater detail below. Further, as indicated above, embodiments described in the present disclosure may be implemented using computer-readable media for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. This interpretation of the phrase "A or B" is still applicable even though the term "A and/or B" may be used at times to include the possibilities of "A" or "B" or "A and B."

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    identifying a plurality of source code edits made between a buggy version of first source code of a first software program and a repaired version of the first source code in which the buggy version includes a first error and the first error has been corrected in the repaired version;
    identifying a plurality of clusters of the source code edits, wherein each cluster of the plurality of clusters includes one or more source code edits of the plurality of source code edits;
    identifying a plurality of valid clusters of the plurality of clusters based on successful compiling of the first source code with respect to each valid cluster of the plurality of valid clusters wherein identifying a respective valid cluster of the plurality of valid clusters includes:
        generating a first modified version of the first source code by applying the one or more source code edits that correspond to the respective valid cluster to the buggy version of the first source code;
        generating a second modified version of the first source code by reversing the one or more source code edits that correspond to the respective valid cluster from the repaired version of the first source code; and
        identifying the respective valid cluster as being valid in response to the first modified version of the first source code and the second modified version of the first source code successfully compiling;
    identifying one or more invalid clusters of the plurality of clusters based on one or more compiling errors of the first software program with respect to each of the one or more invalid clusters; and
    identifying, as a first repair of the first error, a particular set of one or more valid clusters of the plurality of valid clusters while excluding the one or more invalid clusters from consideration.

2. The method of claim 1, further comprising:
    identifying a second error in second source code of a second software program; and
    performing repair operations on the second source code with respect to the second error based on the first repair.

3. The method of claim 1, wherein identifying a respective invalid cluster of the one or more invalid clusters includes:
    generating a third modified version of the first source code by applying the one or more source code edits that correspond to the respective invalid cluster to the buggy version of the first source code; and
    identifying the respective invalid cluster as being invalid in response to the third modified version of the first source code having one or more compiling errors.

4. The method of claim 1, wherein identifying a respective invalid cluster of the one or more invalid clusters includes:
    generating a third modified version of the first source code by reversing the one or more source code edits that correspond to the respective invalid cluster from the repaired version of the first source code; and
    identifying the respective invalid cluster as being invalid in response to the third modified version of the first source code having one or more compiling errors.

5. The method of claim 1, wherein the particular set of one or more valid clusters has the smallest number of total edits that correct the first error as compared to other sets of valid clusters that also correct the first error.

6. The method of claim 1, wherein identifying the particular set of one or more valid clusters as the first repair includes:
    generating a third modified version of the first source code by applying the one or more source code edits that correspond to the particular set of one or more valid clusters to the buggy version of the first source code; and
    identifying the particular set of one or more valid clusters as the first repair in response to the third modified version of the first source code repairing the first error.

7. The method of claim 1, wherein identifying the particular set of one or more valid clusters as the first repair includes:
    generating a third modified version of the first source code by reversing the one or more source code edits that correspond to the particular set of one or more valid clusters from the repaired version of the first source code; and
    identifying the particular set of one or more valid clusters as the first repair in response to the third modified version of the first source code including the first error.

8. One or more non-transitory computer-readable storage media configured to store instructions that, in response to being executed, cause a system to perform operations, the operations comprising:
    identifying a plurality of source code edits made between a buggy version of first source code of a first software program and a repaired version of the first source code in which the buggy version includes a first error and the first error has been corrected in the repaired version;
    identifying a plurality of clusters of the source code edits, wherein each cluster of the plurality of clusters includes one or more source code edits of the plurality of source code edits;

identifying a plurality of valid clusters of the plurality of clusters based on successful compiling of the first source code with respect to each valid cluster of the plurality of valid clusters;

identifying one or more invalid clusters of the plurality of clusters based on one or more compiling errors of the first software program with respect to each of the one or more invalid clusters; and identifying, as a first repair of the first error, a particular set of one or more valid clusters of the plurality of valid clusters while excluding the one or more invalid clusters from consideration, wherein identifying the particular set of one or more valid clusters as the first repair includes:

generating a first modified version of the first source code by applying the one or more source code edits that correspond to the particular set of one or more valid clusters to the buggy version of the first source code;

generating a second modified version of the first source code by reversing the one or more source code edits that correspond to the particular set of one or more valid clusters from the repaired version of the first source code; and identifying the particular set of one or more valid clusters as the first repair in response to the first modified version of the first source code repairing the first error and in response to the second modified version of the first source code including the first error.

9. The one or more non-transitory computer-readable storage media of claim 8, wherein the operations further comprise:

identifying a second error in second source code of a second software program; and performing repair operations on the second source code with respect to the second error based on the first repair.

10. The one or more non-transitory computer-readable storage media of claim 8, wherein identifying a respective valid cluster of the plurality of valid clusters includes:

generating a third modified version of the first source code by applying the one or more source code edits that correspond to the respective valid cluster to the buggy version of the first source code; and identifying the respective valid cluster as being valid in response to the third modified version of the first source code successfully compiling.

11. The one or more non-transitory computer-readable storage media of claim 8, wherein identifying a respective valid cluster of the plurality of valid clusters includes:

generating a third modified version of the first source code by reversing the one or more source code edits that correspond to the respective valid cluster from the repaired version of the first source code; and identifying the respective valid cluster as being valid in response to the third modified version of the first source code successfully compiling.

12. The one or more non-transitory computer-readable storage media of claim 8, wherein identifying a respective invalid cluster of the one or more invalid clusters includes:

generating a third modified version of the first source code by applying the one or more source code edits that correspond to the respective invalid cluster to the buggy version of the first source code; and identifying the respective invalid cluster as being invalid in response to the third modified version of the first source code having one or more compiling errors.

13. The one or more non-transitory computer-readable storage media of claim 8, wherein identifying a respective invalid cluster of the one or more invalid clusters includes:

generating a third modified version of the first source code by reversing the one or more source code edits that correspond to the respective invalid cluster from the repaired version of the first source code; and identifying the respective invalid cluster as being invalid in response to the third modified version of the first source code having one or more compiling errors.

14. The one or more non-transitory computer-readable storage media of claim 8, wherein the particular set of one or more valid clusters has the smallest number of total edits that correct the first error as compared to other sets of valid clusters that also correct the first error.

15. A system comprising:

one or more processors; and one or more non-transitory computer-readable storage media configured to store instructions that, in response to being executed by the one or more processors, cause the system to perform operations, the operations comprising:

identifying a plurality of source code edits made between a buggy version of first source code of a first software program and a repaired version of the first source code in which the buggy version includes a first error and the first error has been corrected in the repaired version;

identifying a plurality of clusters of the source code edits, wherein each cluster of the plurality of clusters includes one or more source code edits of the plurality of source code edits;

identifying a plurality of valid clusters of the plurality of clusters based on successful compiling of the first source code with respect to each valid cluster of the plurality of valid clusters, wherein identifying a respective valid cluster of the plurality of valid clusters includes:

generating a first modified version of the first source code by applying the one or more source code edits that correspond to the respective valid cluster to the buggy version of the first source code;

generating a second modified version of the first source code by reversing the one or more source code edits that correspond to the respective valid cluster from the repaired version of the first source code and identifying the respective valid cluster as being valid in response to the first modified version of the first source code and the second modified version of the first source code successfully compiling; and identifying, as a first repair of the first error, a particular set of one or more valid clusters of the plurality of valid clusters, wherein identifying the particular set of one or more valid clusters as the first repair includes:

generating a third modified version of the first source code by applying the one or more source code edits that correspond to the particular set of one or more valid clusters to the buggy version of the first source code;

generating a fourth modified version of the first source code by reversing the one or more source code edits that correspond to the particular set of one or more valid clusters from the repaired version of the first source code; and identifying the particular set of one or more valid clusters as the first repair in response to the third modified version of the first source code repairing the first error and in response to the fourth modified version of the first source code including the first error.

16. The system of claim 15, wherein the operations further comprise:

identifying one or more invalid clusters of the plurality of clusters based on one or more compiling errors of the first software program with respect to each of the one or more invalid clusters, wherein the one or more invalid clusters are excluded from consideration while identifying the first repair.

\* \* \* \* \*